J. ANDERSON.
Horse Sun-Bonnet.
No. 100,000.                                Patented Feb. 22, 1870.
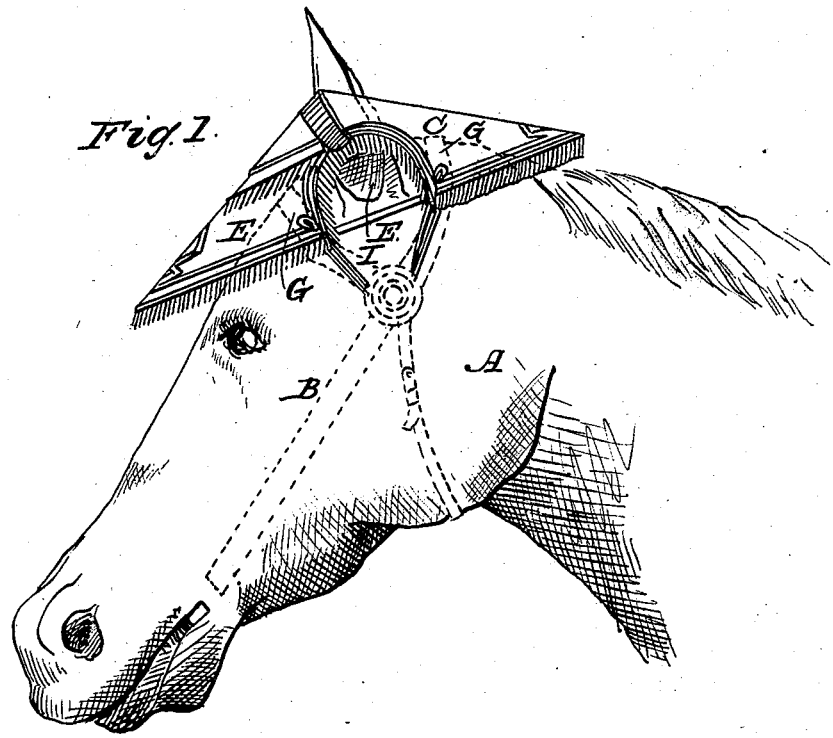
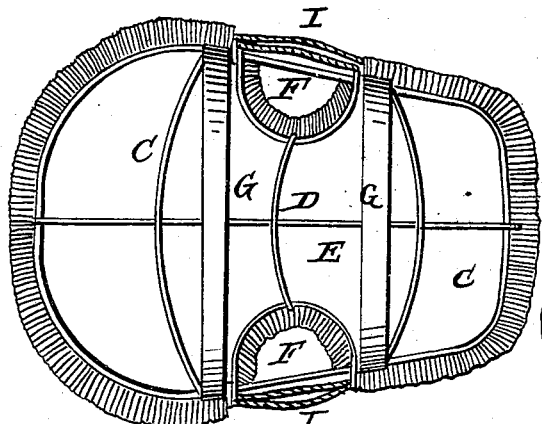
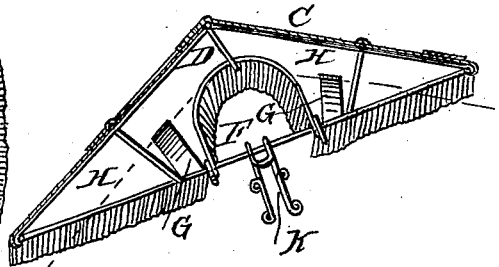
Witnesses
Wm. H. Cummeyer
Samuel Lewis
Inventor
John Anderson

United States Patent Office.

JOHN ANDERSON, OF BROOKLYN, NEW YORK.

Letters Patent No. 100,000, dated February 22, 1870.

IMPROVED SUN-BONNET FOR HORSES.

The Schedule referred to in these Letters Patent and making part of the same.

*To all whom it may concern:*

Be it known that I, JOHN ANDERSON, of Brooklyn, Kings County, and State of New York, have invented a new and useful Improvement in Shields or Sun-Bonnets for Horses; and do hereby declare that the following is a general description thereof, reference being had to the accompanying drawings making part of this specification.

As the object of this invention is the shielding of the horse's head from the rays of the sun, the present applicant had necessarily to provide a space between the head and the protecting shield or bonnet for the constant passage of a current of air. It was also requisite to have the bonnet or shield not only easily attached and detached, but that it should be securely held in position in a manner agreeable to the animal. Moreover, it was equally essential that the contrivance for fastening on the bonnet should not so pull upon the devices for preserving the air space that the said space should be too much reduced. Hence the elastic side attachments and the supporting transverse straps or bands shown in the drawings are of far different tensile strengths, the former being of ample strength for securing the bonnet in place, but far too weak to so strain upon the transverse or supporting straps as to too far reduce the air space between the horse's head and the shield, upon which the utility of latter depends.

In the said drawings—

Figure 1 represents my improved shield placed on top of the head showing its elastic seats, the apertures for the ears, and the connection with the bridle, and forming with a bridle the head gear of the horse;

Figure 2 an under-side view; and

Figure 3 a vertical section of said shield.

In the said drawings—

A indicates the head and neck of a horse, and

B the bridle.

C is the shield composed of a wire, wooden, or other suitable frame work, D, which is covered with cloth, E, or other suitable material.

F F are the apertures in the shield through which the horse's ears protrude.

G G are the bearings which rest on the head, supporting the shield, and leaving space H for a current of air between the horse's head and the shield, and I I are the elastic fastenings which connect the shield on both sides with the bridle, (a modification of said fastening being represented by the hook K in fig. 3, which, while it steadily connects the shield with the bridle, admits of adjustment of the shield back and forth.)

This shield, as before stated, is placed on the top of the horse's head, projecting in front over the forehead, and back over and covering the junction of the cerebellum or little brain with the spinal marrow which lies near the surface, and is quickly effected by the heat of the sun, and in my experience I have found it to be efficient in protecting horses from sun-stroke.

I am aware that Letters Patent of the United States were granted to me July 6, 1869, for an improved shield for protecting horses from sun-stroke; but I found that, in the absence of the bearings G G, the shield or bonnet was apt to descend to the head, leaving no air space between the bonnet and the head, and besides this the rigid fastening tended to throw the bonnet back and forth on the horse's face at each movement of the head. These defects suggested to me my present improvement.

Having described my invention,

What I claim as new, and desire to secure by Letters Patent, is—

1. The straps or bands (elastic or otherwise) G G resting on the horse's head before and behind the ears, and securing a constant current of air, as shown and specified.

2. The elastic or other fastenings I I, when attached to the bridle with a view to facility of attachment and removal, as explained in preamble and specification.

In testimony whereof, I have hereunto set my signature this 28th day of July, A. D. 1869.

JOHN ANDERSON.

Witnesses:
 WM. H. CAMMEYER,
 SAMUEL LEWIS.